United States Patent
Walton et al.

(10) Patent No.: US 9,499,271 B2
(45) Date of Patent: Nov. 22, 2016

(54) SYSTEMS AND METHODS FOR POSITIONING A SECTION DIVIDER ASSEMBLY WITHIN A VEHICLE

(71) Applicant: THE BOEING COMPANY, Chicago, IL (US)

(72) Inventors: Brent Clarence Walton, Seattle, WA (US); William F. Herold, Everett, WA (US); Hung Quang Nguyen, Seattle, WA (US); Kevin Duane Bass, Everett, WA (US); Christopher L. Schwitters, Everett, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 14/682,197

(22) Filed: Apr. 9, 2015

(65) Prior Publication Data
US 2016/0297525 A1    Oct. 13, 2016

(51) Int. Cl.
*B64D 11/00*    (2006.01)

(52) U.S. Cl.
CPC ................. *B64D 11/0023* (2013.01)

(58) Field of Classification Search
CPC ................................. B64D 11/0023
See application file for complete search history.

(56) References Cited

U.S. PATENT DOCUMENTS

| | | | | |
|---|---|---|---|---|
| 2,294,295 A * | 8/1942 | Hankins | ................. | B61D 25/00 160/26 |
| 2,605,064 A * | 7/1952 | Davis | ...................... | B64D 9/00 105/345 |
| 2,658,759 A * | 11/1953 | Flory | ........................ | F41J 9/02 124/32 |
| 2,710,731 A * | 6/1955 | Bright | ................ | B64D 11/0023 105/323 |
| 4,088,322 A * | 5/1978 | Nikoden, Jr. | ............ | F41J 11/02 273/406 |
| 4,102,381 A * | 7/1978 | Bratschi | .................... | E06B 9/36 160/168.1 R |
| 6,189,831 B1 * | 2/2001 | Asai | .................... | B64D 11/0023 244/118.5 |
| 6,523,779 B1 * | 2/2003 | Michel | ............... | B64D 11/0023 244/118.5 |
| 8,262,022 B2 | 9/2012 | Young | | |
| 8,556,212 B2 * | 10/2013 | Breuer | ................... | B64D 11/00 104/89 |
| 8,684,308 B2 * | 4/2014 | Warner | .............. | B64D 11/0023 244/118.5 |
| 2007/0018044 A1 | 1/2007 | Bock | | |

FOREIGN PATENT DOCUMENTS

| | | |
|---|---|---|
| AU | 523380 | 8/1982 |
| EP | 1619120 | 1/2006 |
| WO | WO 2013/142660 | 9/2013 |

OTHER PUBLICATIONS

Extended European Search Report for EP 16160259.4-1754, dated Jul. 20, 2016.

* cited by examiner

*Primary Examiner* — Justin Benedik
(74) *Attorney, Agent, or Firm* — Joseph M. Butscher; The Small Patent Law Group, LLC

(57) ABSTRACT

A section divider system is configured to separate sections within an internal cabin of a vehicle. The section divider system may include a first rail secured to a fixed panel within the internal cabin. A closeout panel may be secured to the fixed panel. The closeout panel extends between the fixed panel and a passenger service unit (PSU) within the internal cabin. A clearance space is formed between a portion of the closeout panel and the PSU. The closeout panel is configured to prevent access to an interior of the PSU. A bracket is secured to the first rail. One or more connecting beams extend from the bracket through the clearance space. A section divider assembly is connected to the connecting beam(s).

21 Claims, 9 Drawing Sheets

SYSTEMS AND METHODS FOR POSITIONING A SECTION DIVIDER ASSEMBLY WITHIN A VEHICLE

FIELD OF EMBODIMENTS OF THE DISCLOSURE

Embodiments of the present disclosure generally relate to systems and methods for positioning a section divider assembly within a vehicle.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Each passenger section may be separated from an adjacent passenger section by a cabin transition area, which may include one or more monuments, such as walls, work stations, or the like. Curtains may be used to separate sections of an aircraft for a variety of reasons, including class separation, privacy, work areas, and the like. For example, a cabin transition area between a business class section and a coach section may include a curtain assembly within an aisle and curtain assemblies above and behind seat backs on either side of the aisle. A curtain moveably connected to a curtain track that spans over any aisle may be selectively opened and closed. When opened, such as during a boarding process, passengers may pass from one section to another section, such as from the business class section to the coach section. During flight, the curtain may be closed to indicate that passengers are not allowed to pass (or at least discouraged from passing) from the coach section into the business class section.

Known class or section dividers include a moveable curtain positioned within an aisle and lateral curtains extending from the aisle to outboard interior walls within a cabin. Such class dividers provide a stark closed appearance. The closed curtains of the class divider tend to compartmentalize an interior cabin. Further, known class dividers include bulky, pleated curtains that may not be aesthetically pleasing.

Additionally, the class dividers are typically fixed with respect to a location within the interior cabin. In order to reposition the class dividers, portions of stowage bins and passenger service units are typically removed to expose fasteners. Aircraft technicians, such as mechanics, then remove the fasteners and mounting structures and secure the assemblies at another position. As can be appreciated, the process of repositioning class dividers is time and labor intensive.

A need exists for a class divider that provides a more open look and feel within an interior cabin of an aircraft. Additionally, a need exists for a more aesthetically pleasing class divider. Further, a need exists for a class divider that may be quickly and efficiently repositioned within an interior cabin of an aircraft.

SUMMARY OF THE DISCLOSURE

Certain embodiments of the present disclosure provide a section divider system configured to separate sections within an internal cabin of a vehicle. The section divider system may include a first rail secured to a fixed panel within the internal cabin. A closeout panel may be secured to the fixed panel. The closeout panel may extend between the fixed panel and a passenger service unit (PSU) within the internal cabin. A clearance space may be formed between a portion of the closeout panel and the PSU. The closeout panel is configured to prevent access to an interior of the PSU. A bracket may be secured to the first rail. One or more connecting beams extend from the bracket through the clearance space. A section divider assembly may be connected to the connecting beam(s). In at least one embodiment, the section divider assembly is configured to be moveably adjusted by the bracket being moved in relation to the first rail.

The section divider system may also include a second rail secured to one or both of the fixed panel or another fixed portion of the internal cabin. The section divider assembly may include a fitting that is secured to the second rail. In at least one embodiment, the fitting may be moveably secured to the second rail.

The closeout panel may extend into a gap between the fixed panel and a portion of a stowage bin within the internal cabin. The closeout panel may be further configured to prevent movement of fingers of an individual past a defined position within the gap.

The section divider assembly may include a header coupled to a barrier extending downwardly from the header. The section divider assembly may be configured to be positioned over one or more seats (such as over a rear portion of a seatback) within a row of the internal cabin. In at least one embodiment, the header is sized and shaped to be outside of a range of motion of (and therefore not interfere) with a pivotal bucket of a stowage bin. The header may include an intermediate peak that connects to the connecting beam(s) of the bracket.

The first rail may include a plurality of regularly-spaced retaining holes. Each of the regularly-spaced retaining holes is configured to receive and retain a position securing member coupled to the bracket in order to secure the section divider assembly in position.

In at least one embodiment, the closeout panel is cantilevered with respect to the fixed panel. The closeout panel may include a panel securing portion including a flat beam that overlies a portion of the fixed panel. A stop protuberance (such as a formed bump, kink, or the like) extends downwardly and away from the flat beam. The stop protuberance is configured to prevent an individual from reaching further into a gap between the fixed panel and a stowage bin. The stop protuberance is configured to be spaced apart from the stowage bin. A covering flap extends downwardly from the stop protuberance. The covering flap is configured to prevent access to the interior of the PSU. The clearance space is formed between a terminal edge of the covering flap and the PSU. The covering flap may extend away from the flat beam at an angle.

In at least one embodiment, the angle may be within the range of 15-75 degrees from horizontal such that the covering flap is at an angle that is between vertical and horizontal. The angle may be sloped some away from being vertical to accommodate a shape of a stowage bin. Also, the angle may not be flat (e.g. parallel with a floor), in order to accommodate space for the PSU. Further, the sloped nature of the covering flap makes it less likely that an individual may try to use the covering flap as a handle. If a passenger does attempt to do so, he/she will be unable to apply as much force thereto, as the sloped surface may not be easy to grip.

In at least one embodiment, the bracket is configured to be slidably moved through or on at least a portion of the first rail. The bracket may include one or more rollers configured to rotatably move on or through at least a portion of the first rail. The bracket further may also include a spring-biased position securing member operatively connected to a pull cord.

The first rail may be an inboard rail. The first rail may be integrally formed with a PSU rail that securely connects the PSU to the fixed panel.

Certain embodiments of the present disclosure provide a shielding assembly configured to be secured to a strongback within an internal cabin of a vehicle. The shielding assembly is configured to extend into a gap between the strongback and a stowage bin. The shielding assembly may include a panel securing portion including a flat beam that overlies a portion of the strongback. A stop protuberance extends downwardly and away from the flat beam. The stop protuberance is configured to prevent an individual from reaching further into the gap between the fixed panel and the stowage bin. The stop protuberance is configured to be spaced apart from the stowage bin so as not to interfere with movement of the stowage bin between closed and open positions. A covering flap extends downwardly from the stop protuberance. The covering flap extends away from the flat beam at an angle. The covering flap is configured to prevent access to an interior of the passenger service unit (PSU). A clearance space is formed between a terminal edge of the covering flap and the PSU.

Certain embodiments of the present disclosure provide a section divider system configured to separate sections within an internal cabin of a vehicle. The section divider system may include an inboard rail secured to a fixed strongback within the internal cabin. An outboard rail may be secured to one or both of the fixed strongback or another fixed portion of the internal cabin. A closeout panel may be secured to the strongback. The closeout panel extends between the strongback and a passenger service unit (PSU) within the internal cabin. The closeout panel extends into a gap between the strongback and a portion of a stowage bin within the internal cabin. The closeout panel is further configured to prevent movement of fingers of an individual past a defined position within the gap. A clearance space is formed between a portion of the closeout panel and the PSU. The closeout panel is configured to prevent access to an interior of the PSU. A bracket may be secured to the inboard rail. One or more connecting beams extend from the bracket through the clearance space. A section divider assembly may be connected to the connecting beam(s). The section divider assembly may be connected to the outboard rail through at least one fitting. The section divider assembly may be configured to be moveably adjusted in relation to the inboard rail and the outboard rail. The section divider assembly may include a header coupled to a barrier extending downwardly from the header. The section divider assembly is configured to be positioned over one or more seats within a row of the internal cabin. The header may include an intermediate peak that connects to the one or more connecting beams of the bracket.

DETAILED DESCRIPTION OF THE DISCLOSURE

Figure 1:
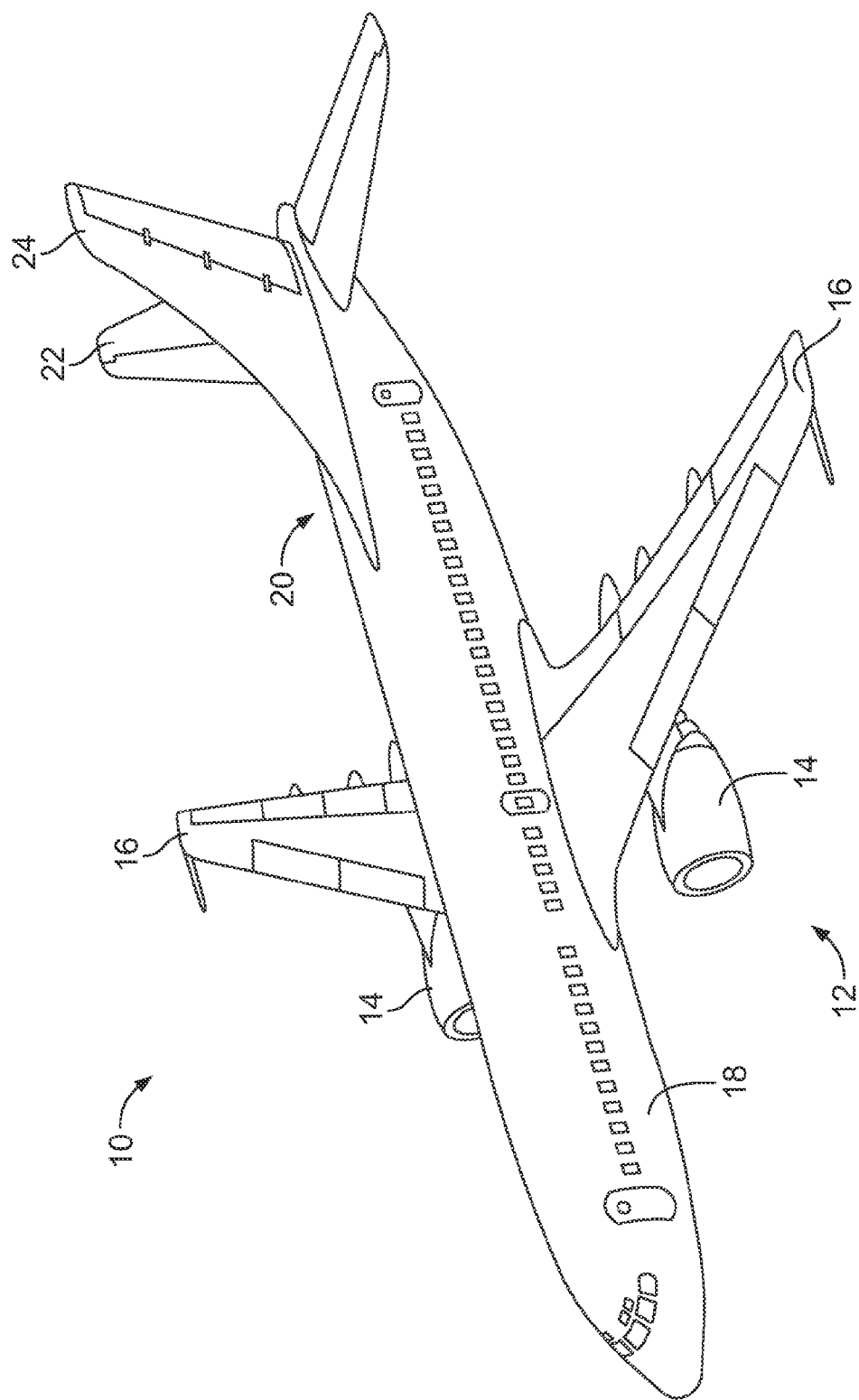
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an aesthetically-pleasing section divider assembly that may be positioned and repositioned within a vehicle, such as an aircraft. The section divider assembly may include arcuate surfaces that reduce large gaps between the section divider assembly, a passenger service unit, and/or a stowage bin within an internal cabin.

Embodiments of the present disclosure provide a closeout panel that is configured to be positioned between a passenger service unit and a stowage bin. In general, a gap may exist between a passenger service unit and a stowage bin. The closeout panel covers a portion of the passenger service unit so that an individual may not move a hand therein. In this regard, the closeout panel protects the passenger service unit, and ensures a tamper-resistance assembly. Further, the closeout panel is configured to prevent a hand from passing a defined distance into the gap. The closeout panel also prevents a hand or fingers from being pinched between the passenger service unit and the stowage bin.

Embodiments of the present disclosure also provide a closeout panel having a terminal end that provides a clearance area that allows accessibility to a rail of the passenger service unit. As such, a class or section divider rail may be positioned within the clearance area. The class divider rail is configured to operatively couple to a class or section divider assembly to secure the section divider assembly in position. The section divider rail may be configured to allow the section divider assembly to translate or otherwise move therethrough or over so that the section divider assembly may be selectively positioned within an internal cabin of a vehicle.

Additionally, the shape and length of the closeout panel allows for greater capacity for overhead luggage. For example, the closeout panel is shaped and configured to provide the clearance area, which may allow for non-radial stowage bin profiles.

Embodiments of the present disclosure provide a section divider assembly that may be quickly and easily moved within an internal cabin of a vehicle. The section divider assembly may be quickly and easily moved among multiple pre-set locations, such as defined by incremental detents, relative to seat locations. As such, a service crew of the vehicle (such as flight attendants) may move the section divider assembly relative to rows within the internal cabin depending on service needs for various routes of the vehicle.

Further, embodiments of the present disclosure may be used with existing passenger service units. As such, there is no need to replace existing passenger service units (which would otherwise increase costs) to accommodate embodiments of the present disclosure.

Certain embodiments of the present disclosure provide an interior shielding assembly, such as a closeout panel, that may include a cantilevered shield extending from a strongback of a stowage bin. The shield may span across an open angle portion of a passenger service unit rail to an end of the passenger service rail. The shield may include a protrusion that may have an approximate length of a finger (of an average-sized adult) form the end of the passenger service unit rail. The shield may include a profile that is substantially planar/flat and angled between horizontal and vertical. The shield may be substantially parallel to an adjacent pivot stow bin, but offset from the pivot stow bin by a particular distance in order to allow the stow bin to move freely between open and closed positions. The distance may be, for example, greater than 0.4", but less than 1.5". Alternatively, the distance may be less than 0.4", and greater than 1.5". The shield may be trimmed in at least some areas to allow access to the space between the shield and the passenger service rail in order to provide access to an adjustable mounting rail located within the space. A minimum distance between the shield and the pivot stow bin may be greater than a distance between an upper portion of the pivot bin and a strongback.

Certain embodiments of the present disclosure provide a rail system that may include a structural rail positioned between a shield and a passenger service unit rail. The structural rail may attach to a strongback. The structural rail may include adjustable detents for discrete and secure engagement of a class divider assembly. The adjustable detents may correspond to specific locations. For example, for each row of seats, there may be one adjustable detent. The adjustable detent location may correspond to an ideal location for passenger comfort, safety, and space, for example.

FIG. 1 illustrates a perspective top view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies, as described below.

Alternatively, instead of an aircraft, embodiments of the present disclosure may be used with various other vehicles, such as automobiles, buses, locomotives and train cars, seacraft, spacecraft, and the like.

Figure 2A:
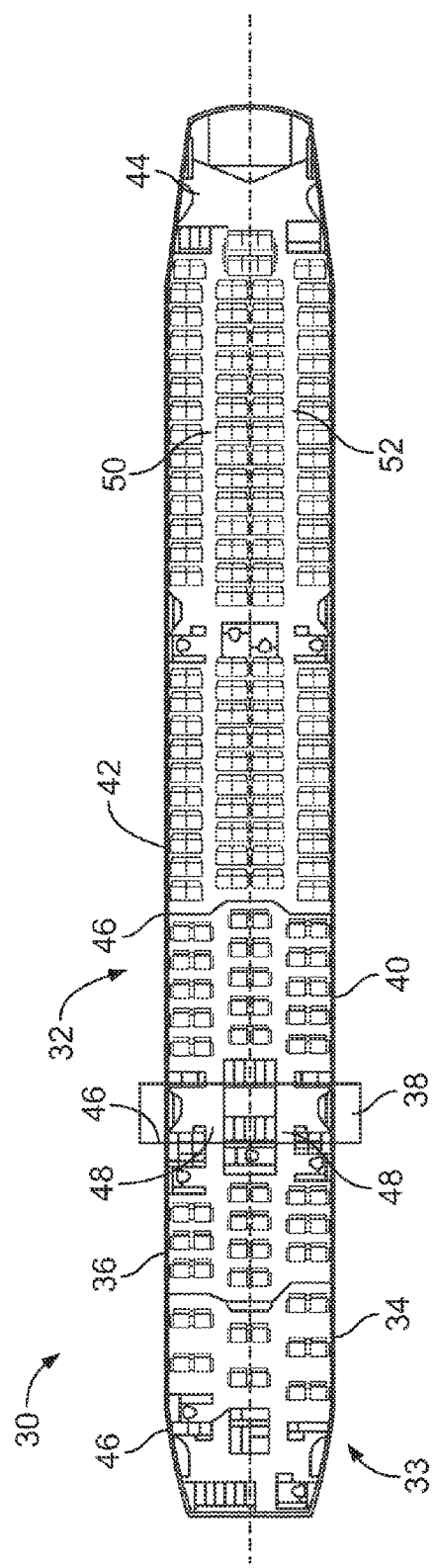
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34, a business class section 36, a front galley station 38, an expanded economy or coach section 40, a standard economy of coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
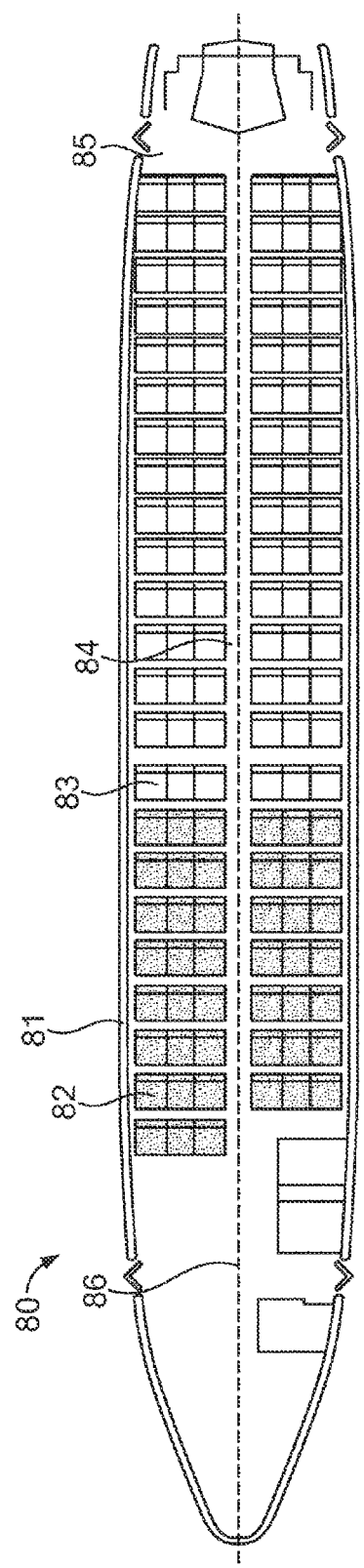
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
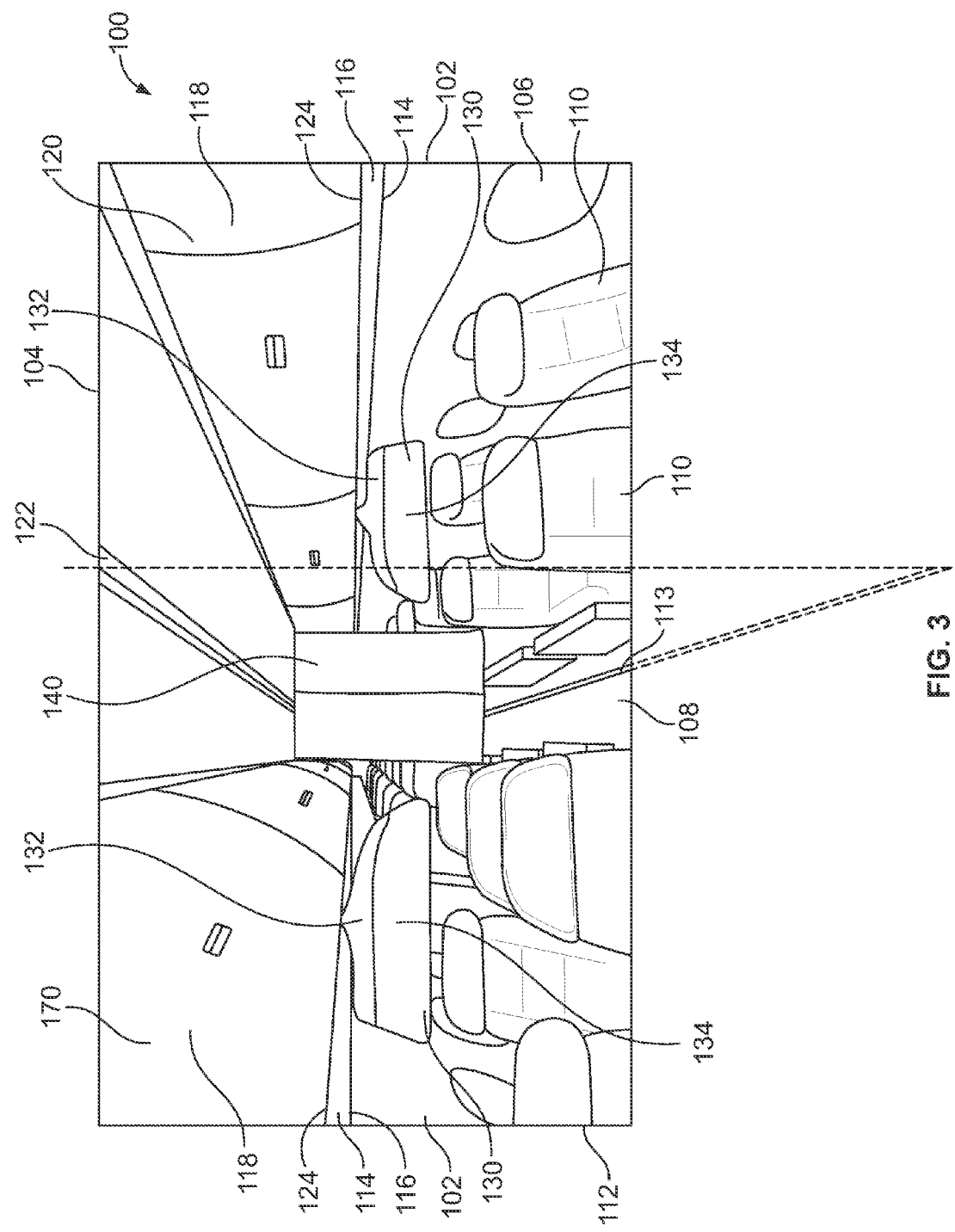
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard walls 102 connected to a ceiling 104. Windows 106 may be formed within the outboard walls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard wall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bins 118 are secured to the ceiling 104 and/or the outboard wall 102 above and inboard from the PSU 114 on either side of the aisle. The overhead stowage bins 118 extend between the front and rear end of the internal cabin 100. Each overhead stowage bin 118 may include a bucket 120 pivotally secured to a strongback (hidden from view in FIG. 3). The overhead stowage bins 118 may be positioned above and inboard from lower surfaces of the PSUs 114. The overhead stowage bins 118 are configured to be pivoted open in order to accept passenger carry-on luggage, for example.

As used herein, the term "outboard" means a position that is further away from a central longitudinal plane 122 (may also be referred to as buttock line zero) of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin 118.

As shown, a gap 124 extends along a length of the internal cabin 100 between the PSU 114 and the stowage bins 118 on each side of the aisle 113. The gap 124 allows the buckets 120 of the stowage bins 118 to be pivoted between open and closed positions. A closeout panel may be secured to a strongback and extend into the gap 124, as described below. The closeout panel covers an opening of the PSU 114, and protects the internal components from being touched by passengers. Further, the closeout panel is configured to prevent an individual from passing fingers or a hand past a particular point within the gap, such as through a protruding bump that extends toward the stowage bin, but is spaced apart therefrom. The protuberance, such as the protruding bump, is spaced apart from the stowage bin to not interfere with a moveable portion of the stowage bin as it pivots between open and closed positions. That is, through an entire range of motion of a moveable portion of the stowage bin, no portion of the closeout panel contacts any portion of the stowage bin. The protuberance may be sized and shaped to not contact the stowage bin, but at the same time prevent an individual from reaching into the gap past the protuberance.

For example, the separation distance between the protuberance and the stowage bin may be between 0.1"-0.3" during a range of motion of a moveable portion of the stowage bin between open and closed positions. Optionally, the separation distance may be less than 0.1", but greater than 0, and greater than 0.3", but may be less than 0.4".

A section divider assembly 130 may be positioned within the internal cabin 100 to define different sections therein. For example, the section divider assembly 130 may be positioned over one or more seats 110 within a row 112. Each section divider assembly 130 may include an attachment header 132 that securely connects to a downwardly-extending barrier 134. The attachment header 132 may be formed of metal, plastic, or the like. The barrier 134 may be formed of metal, composites, plastic, or the like. For example, the barrier 134 may be formed of a transparent, or semitransparent material. In at least one embodiment, the barrier 134 may be formed of lexan, plexiglass, or the like. Optionally, the barrier may be at least partially formed of a lightweight opaque material, such as fabric, mesh, and/or the like.

Each attachment header 132 securely connects to an inboard rail (hidden from view), such as a PSU rail or a rail connected to the PSU rail, extending within the gap 124, and an outboard rail (hidden from view), such as a rail that supports ventilation ducts, air conditioning units, and/or the like. Each attachment header 132 may be securely connected to overhead positions at two points, such as at the inboard rail and the outboard rail.

As shown, the internal cabin 100 may also include a moveable curtain 140 extending downwardly from the ceiling 104 within the aisle 113. Alternatively, the internal cabin 100 may not include the curtain 140.

Figure 4:
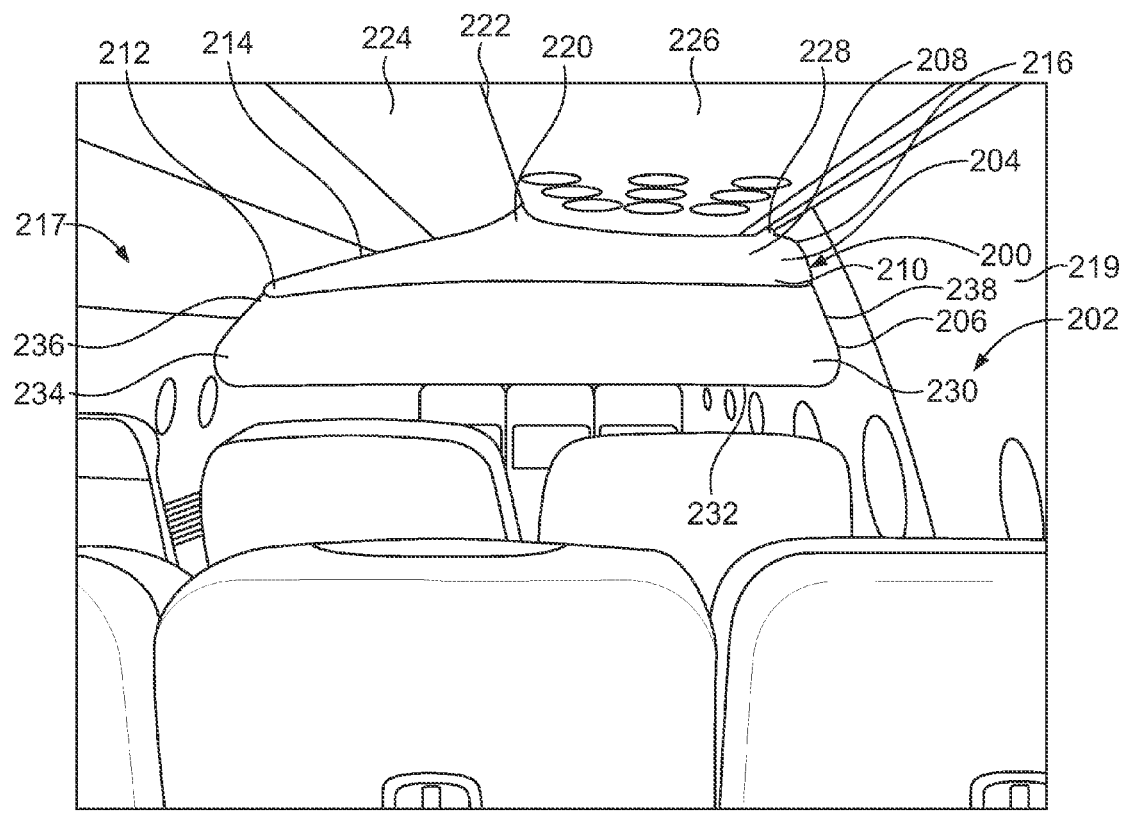
FIG. 4 illustrates a rear view of a section divider assembly within an internal cabin, according to an embodiment of the present disclosure.

FIG. 4 illustrates a rear view of a section divider assembly 200 within an internal cabin 202, according to an embodiment of the present disclosure. The section divider assembly 200 is an example of the section divider assembly 130 shown and described with respect to FIG. 3. While the rear portion of the section divider assembly 200 is shown, a front portion of the section divider mirrors the rear portion. The section divider assembly 200 includes a header 204 that securely retains a barrier 206 extending downwardly from the header 204.

The header 204 may include a panel 208 (such as a single panel, or aligned panels that define an internal chamber therebetween) that may have a bottom edge 210 connected to an inboard tip 212, which connects to an upper edge 214, which, in turn, connects to an outboard end 216. The curvature of the outboard end 216 may conform to a curvature of the outboard wall 219. The outboard end 216 may, or may not, abut into the outboard wall 219. The bottom edge 210 may have straight and curved portions. For example, a portion of the bottom edge 210 may have a slight curvature. The inboard tip 212 may include a semi-circular curvature that connects to the upper edge 214. As shown, the height of the header 204 proximate to an aisle 217 may be shorter than a height of the header 204 proximate to the outboard wall 219. The upper edge 214 may include an intermediate peak 220 that extends into a gap 222 between a stowage bin 224 and a PSU 226. The intermediate peak 220 may connect to a connecting bracket (hidden from view in FIG. 4) that connects to an inboard rail (hidden from view) that may connect to a portion of the PSU 226. Additionally, an outboard fitting 228 may be secured to the upper edge 214 and/or the outboard end 216. The outboard fitting 228 is configured to connect to an outboard rail (hidden from view), such as a HVAC rail that is configured to support one or more heating, ventilation, and/or air conditioning components, such as ventilation ducts, air conditioning units, heating units, and/or the like.

The header 204 is shown having arcuate surfaces and shapes. Alternatively, the header 204 may include various other shapes and sizes than shown.

The barrier 206 may include a panel 230 (such as a single panel, or aligned panels that define an internal chamber therebetween) that may include a straight bottom edge 232 that connects to an inboard end 234 that inwardly curves (that is, inwardly curves away from the aisle 217) and connects to an upper edge 236 that is retained by the header 204. For example, the header 204 may include a slot that receives and retains the upper edge 236. Fasteners, adhesives, and the like may be used to secure the barrier 206 to the header 204. The upper edge 236 connects to an outboard end 238, which may be proximate to the outboard wall 219. The curvature of the outboard end 238 may conform to a curvature of the outboard wall 219. The outboard end 238 may, or may not, abut into the outboard wall 219.

The section divider assembly 200 may have various other shapes and sizes than shown. Further, the section divider assembly 200 may be longer or more compact than shown.

The inboard tip 212 and upper edge 214 of the header 204 may downwardly recede away from the stowage bin 224. The upper edge 214 may be downwardly angled to accommodate pivotal movement of a bucket of the stowage bin 224. All portions of the header 204 (and the barrier 206) may be outside a range of motion of moving portions of the stowage bin, so as not to interfere with movement of the stowage bin between open and closed positions. For example, as the bucket is downwardly pivoted into an open position, the upper edge 214 and the inboard tip 212 are sized and shaped so as not to interfere with movement of the bucket. In this manner, the upper edge 214 and the inboard tip 212 may be positioned below a lower limit of a range of motion of the bucket of the stowage bin 224.

Figure 5:
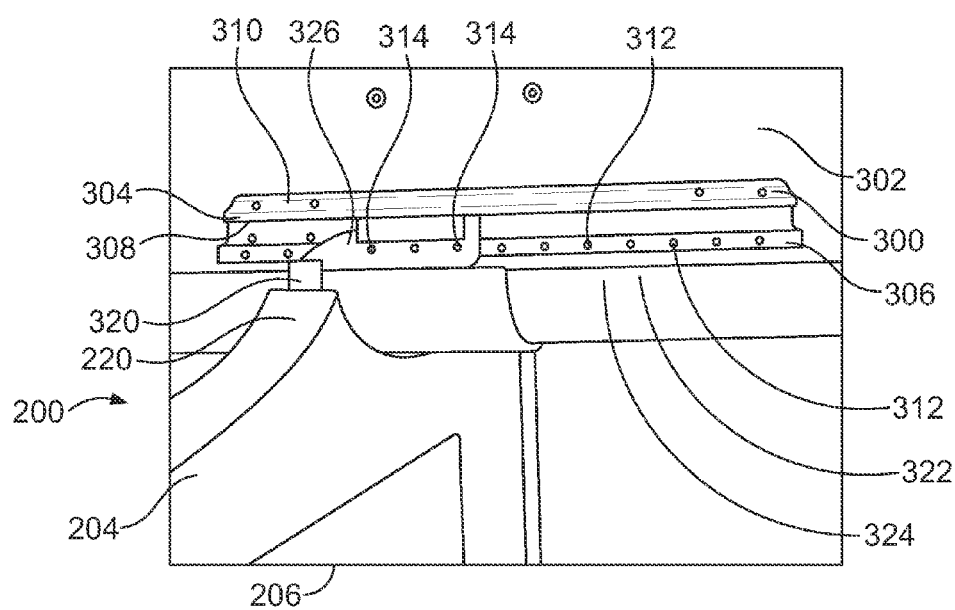
FIG. 5 illustrates a perspective lateral view of a section divider assembly secured to an inboard rail, according to an embodiment of the present disclosure.

FIG. 5 illustrates a perspective lateral view of a section divider assembly 200 secured to an inboard rail 300, according to an embodiment of the present disclosure. For the sake of clarity, a stowage bin bucket is not showed in FIG. 5. The inboard rail 300 may be secured to a fixed panel 302, such as a strongback of the stowage bin. The inboard rail 300 may be formed of a metal, such as aluminum, and may include a main body 304 having a lower lip 306 connected to a recessed beam 308, which may in turn connect to an upper ledge 310. The inboard rail 300 may extend over an entire length, or a substantial length, of an internal cabin. Optionally, segments of inboard rail 300 may be secured to the fixed panel 302. The inboard rail 300 may be secured to the fixed panel 302 through one or more fasteners, adhesives, and/or the like.

As shown, the lower lip 306 includes a plurality of regularly, incrementally spaced fastener through holes 312 over its length. Each fastener through hole 312 is an example of a retaining hole that is configured to receive a portion of a position securing member (such as a fastener, pin, stud, post, or the like) coupled to a bracket. The fastener through holes 312 are configured to receive fasteners 314, such as screws, bolts, or the like, that are configured to secure the section divider assembly 200 to the inboard rail 300 and/or the fixed panel 302. For example, a connecting beam 320 may extend upwardly from the intermediate peak 220, and conform to a curvature of an inboard edge 322 of a PSU 324. The beam 320 may connect to a bracket 326 that retains the fasteners 314. The bracket 326 may secure to the inboard rail 300 through the fasteners 314. In order to position the section divider assembly 200 at a desired position, the fasteners 314 may be removed, and the bracket 326 may be slid to a desired position over a portion of the length of the inboard rail 300. The fasteners 314 may then be aligned with desired fastener through holes 312, and may be tightened therethrough to secure the section divider assembly 200 at a desired position. As such, the section divider assembly 200 may be moveably positioned between desired positions, and secured in place through the fasteners 314.

Figure 6:
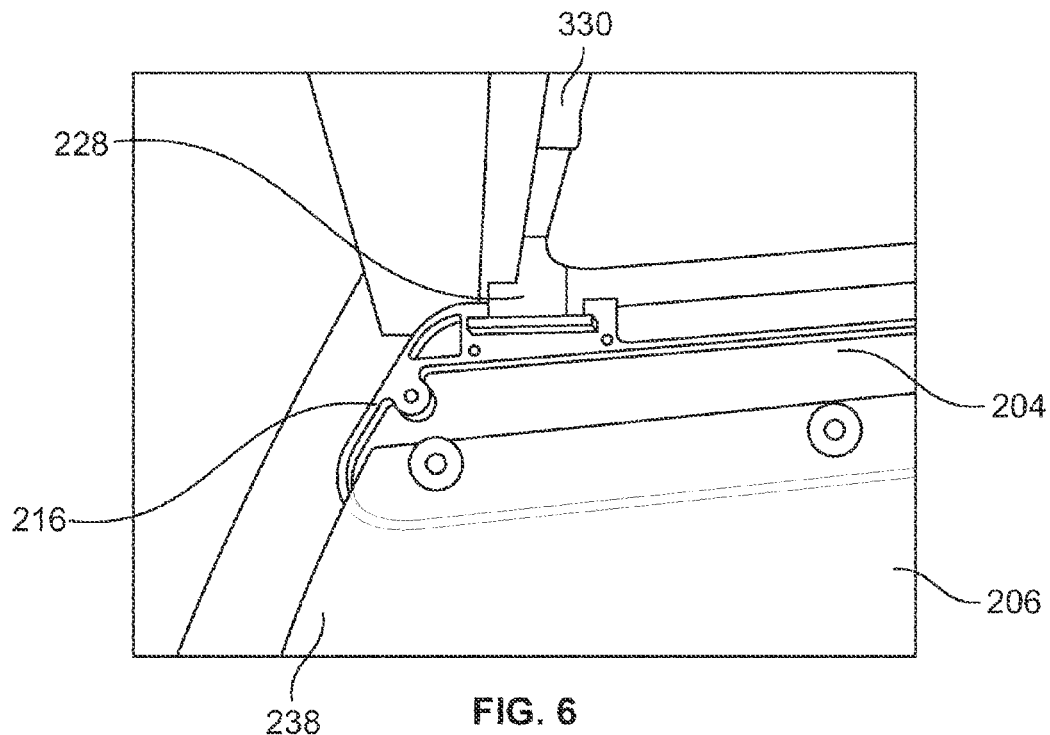
FIG. 6 illustrates a perspective front view of a section divider assembly secured to an outboard rail, according to an embodiment of the present disclosure.

FIG. 6 illustrates a perspective front view of the section divider assembly 200 secured to an outboard rail 330, according to an embodiment of the present disclosure. The outboard rail 330 may be a longitudinal rail that extends over the length of the internal cabin. For example, the outboard rail 330 may be securely connected to a portion of a ceiling or outboard wall of the cabin. The outboard rail 330 may be a ventilation rail that is configured to secure HVAC components, such as ducts, air conditioning units, heating units, and/or the like in position.

The outboard fitting 228 may be a clip, detent, or the like that is configured to be removably connected to the outboard rail 330. For example, the outboard fitting 228 may be configured to snapably, latchably, or otherwise removably secure to a portion of the outboard fitting 228. In at least one embodiment, the outboard fitting 228 may include resilient spring members (for example, spring arms, tabs, or the like) that are configured to deflect inwardly as the outboard fitting 228 is urged into a channel of the outboard rail 330, and flex outwardly into an at-rest position as they move past ledges, ridges, or the like of the outboard rail 330, thereby securely catching on the ledges, ridges, or the like. Alternatively, the outboard fitting 228 may be configured to securely connect to the outboard rail 330 through one or more fasteners, similar to the bracket 326 connecting to the inboard rail 304 (shown in FIG. 5). In at least one other embodiment, the outboard fitting 228 may be slidably retained within a track of the outboard rail 330.

Referring to FIGS. 5 and 6, in order to secure the section divider assembly 200 within an internal cabin, the bracket 326 is moved to a desired position. As the bracket 326 moves, the section divider assembly moves in response thereto. During such movement, the outboard fitting 228 may slide through a portion of the outboard rail 330. Optionally, the outboard fitting 228 may be removed from the outboard rail 330, and secured therein after the bracket 326 is moved to the desired position. In such an embodiment, the outboard fitting 228 may then be secured to a corresponding position of the outboard rail 330, such as through one or more fasteners, a snapping connection, a latching connection, and/or the like.

Figure 7:
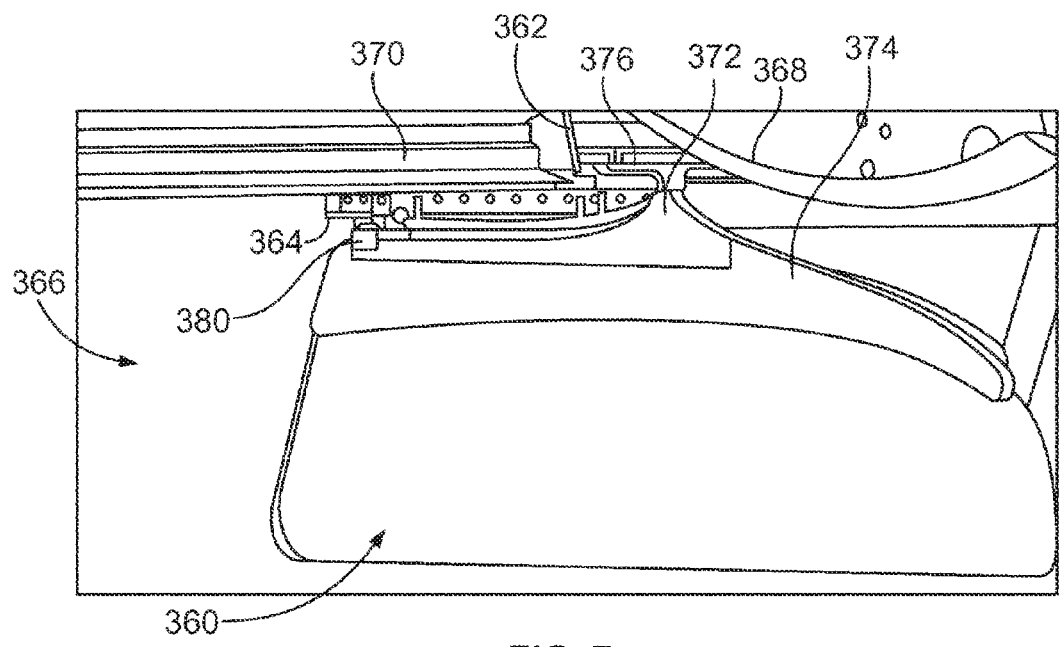
FIG. 7 illustrates a perspective front view of a section divider assembly secured to an inboard rail and an outboard rail within an internal cabin, according to an embodiment of the present disclosure.

FIG. 7 illustrates a perspective front view of a section divider assembly 360 secured to an inboard rail 362 and an outboard rail 364 within an internal cabin 366, according to an embodiment of the present disclosure. For the sake of clarity, portions of a stowage bin 368 and a PSU 370 (such as outer panels) are not shown in order to show the inboard rail 362 and the outboard rail 364. As shown, an intermediate peak 372 of a header 374 connects to a bracket 376, which is moveably secured to the inboard rail 362. The inboard rail 362 may be secured to a portion of the PSU 370, a strongback, and/or the like. An outboard fitting 380 is moveably secured to the outboard rail 364. For example, the outboard fitting 380 may be secured to the outboard rail 364 through one or more fasteners. In at least one other embodiment, the outboard fitting 380 may include a spring-biased detent that is slidably secured within an internal track of the outboard rail 364.

Figure 8A:
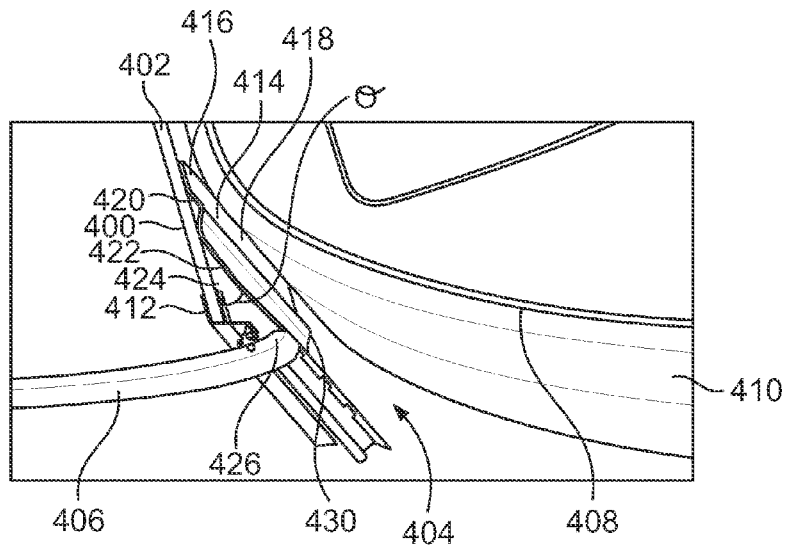
FIG. 8A illustrates a perspective bottom view of a closeout panel secured to a fixed panel within a gap between a personal service unit and a stowage bin, according to an embodiment of the present disclosure.

FIG. 8A illustrates a perspective bottom view of a closeout panel 400 secured to a fixed panel 402 within a gap 404 between a PSU 406 and a stowage bin 408, according to an embodiment of the present disclosure. The closeout panel 400 is an example of a shielding member that may extend through a length, or a portion of the length, of an internal cabin. The closeout panel 400 shields internal portions of the PSU 406 from being touched by passengers.

The fixed panel 402 may be a strongback that is fixed in position with respect to an internal cabin. The stowage bin 408 includes a bucket 410 that is pivotally secured to the strongback. A PSU rail 412 secures to a lower edge of the fixed panel 402 and securely connects the PSU 406 to the fixed panel 402.

Figure 8B:
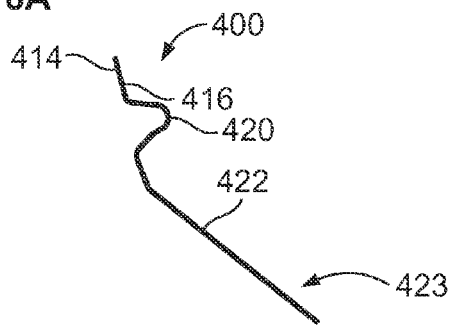
FIG. 8B illustrates an end view of a closeout panel, according to an embodiment of the present disclosure.

FIG. 8B illustrates an end view of the closeout panel 400. Referring to FIGS. 8A and 8B, the closeout panel 400 may be a cantilevered shielding structure extending from the fixed panel 402. The closeout panel 400 may include a panel securing portion 414 having a flat beam 416 that overlies a portion of the fixed panel 402. The flat beam 416 may be securely fixed to the fixed panel 402 through one or more fasteners 418. An upstanding stop protuberance 420 extends downwardly and away from the flat beam 416. The upstanding stop protuberance 420 extends away from the fixed panel 416 and includes a raised bump, ridge, lip, or the like that extends further into the gap 404 toward the bucket 410. A covering flap 422 extends downwardly from the upstanding stop protuberance 420 and may cover a space 424 between an inboard edge 426 of the PSU 406 and the fixed panel 416. As such, the covering flap 422 provides a barrier that prevents access to an interior of the PSU 406. As described below, a terminal portion 423 of the covering flap 422 may be removed in order to accommodate a bracket that connects to a portion of section divider assembly.

The closeout panel 400 may span across an open angle portion θ of the PSU rail 412 to an inboard edge 426. An open angle portion θ may extend from a portion of the PSU rail 412 connected to the fixed panel 402 to an angled plane that extends from an outer surface of the inboard edge 426.

The stop protuberance 420 may provide a protrusion that extends into the gap 404. As shown, the covering flap 422 may include a profile that is substantially flat and angled, and may be substantially parallel to an inboard outer surface of the bucket 410, but may be offset from the bucket 410 by a distance. The distance may be, for example, greater than 0.4", but less than 1.5". Alternatively, the distance may be less than 0.4", and greater than 1.5". A distal portion 430 of the covering flap 422 may be trimmed in at least some areas to allow access to the space 424 in order to provide access to an adjustable mounting rail located therein. A minimum distance between the covering flap 422 and the bucket 410 may be greater than a distance between an upper portion of the bucket 410 and the fixed panel 402.

The covering flap 422 prevents an individual from grasping or otherwise touching internal portions of the PSU 406. Further, the stop protuberance 420 provides a barrier that prevents an individual from reaching further into the gap 404 above the stop protuberance 420. The stop protuberance 420 may be spaced apart from the bucket 410 in order to provide the bucket 410 the ability to freely pivot between open and closed positions. However, the space between stop protuberance 420 and the bucket 410 is too small to allow a finger to pass therethrough. For example, in a closed position, the space between the stop protuberance 420 and the bucket 410 may be less than 0.25", while in the open position, the space may also be less than 0.25". Alternatively, the distance of the space between the stop protuberance 420 and the bucket 410 may be greater or lesser than 0.25". The stop protuberance 420 prevents an individual from reaching into the gap 404 past the stop protuberance 420. As such, the stop protuberance 420 protects an individual from having his/her fingers pinched between the bucket 410 and the fixed panel 402.

As noted, the closeout panel 400 substantially covers an opening of the PSU 406, and protects the internal components of the PSU 406 from being touched by passengers. Further, the closeout panel 400 is configured to prevent an individual from passing fingers or a hand past the stop protuberance 420 within the gap 404. The stop protuberance 420 is spaced apart from the bucket 410 so as not to interfere with the bucket 410 as it pivots between open and closed positions. That is, through an entire range of motion of the bucket 410, no portion of the closeout panel 400 contacts any portion of the bucket 410. The stop protuberance 420 may be sized and shaped to not contact the bucket 410, but at the same time prevent an individual from reaching into the gap 404 past the stop protuberance 420. For example, the separation distance between the stop protuberance 420 and the bucket 410 may be between 0.1"-0.3" during a range of motion of the bucket 410 between open and closed positions. Optionally, the separation distance may be less than 0.1", but greater than 0, and greater than 0.3", but may be less than 0.5".

Figure 9:
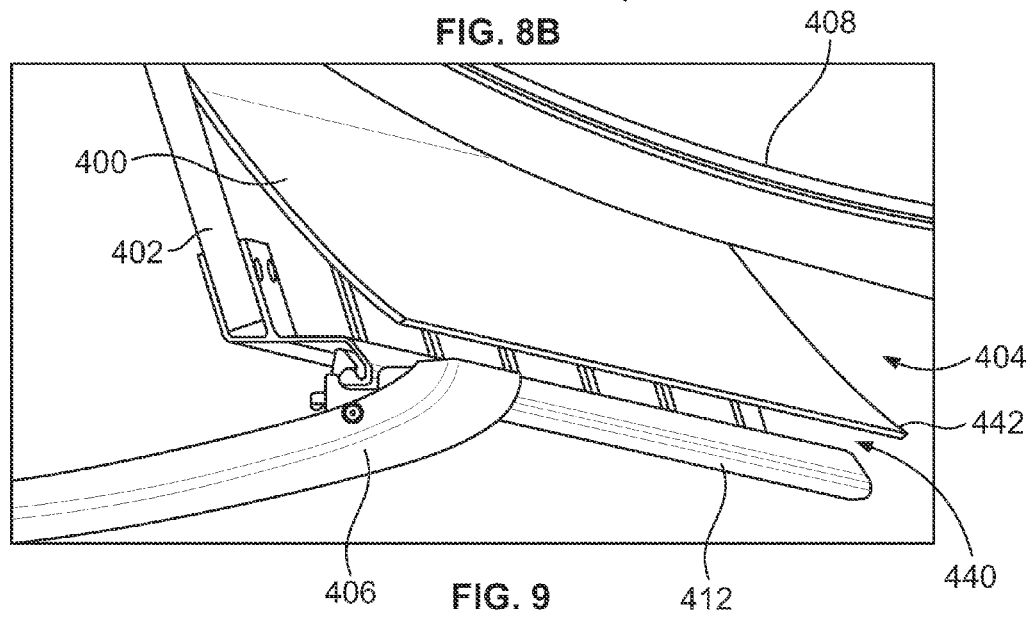
FIG. 9 illustrates a perspective bottom view of a closeout panel secured to a fixed panel within a gap between a personal service unit and a stowage bin, according to an embodiment of the present disclosure.

FIG. 9 illustrates a perspective bottom view of a closeout panel 400 secured to the fixed panel 402 within the gap 404 between the PSU 406 and the stowage bin 408, according to an embodiment of the present disclosure. The closeout panel 400 is the same as the closeout panel 400 shown and described with respect to FIG. 8, except that a terminal portion of covering flap 422 is removed to provide a clearance space 440 between a terminal edge 442 of the covering flap 422 and the inboard edge 426 of the PSU 406. The clearance space 440 is formed to allow a connecting member, such as bracket or connecting beam thereof, to pass in order to secure a section divider assembly to an inboard rail, which may be connected to the PSU rail 412, or integrally formed with the PSU rail 412. Referring to FIGS. 8 and 9, only a portion of the PSU 406 is shown in order to show details of the PSU rail 412, the clearance space 440, and the like.

Figure 10:
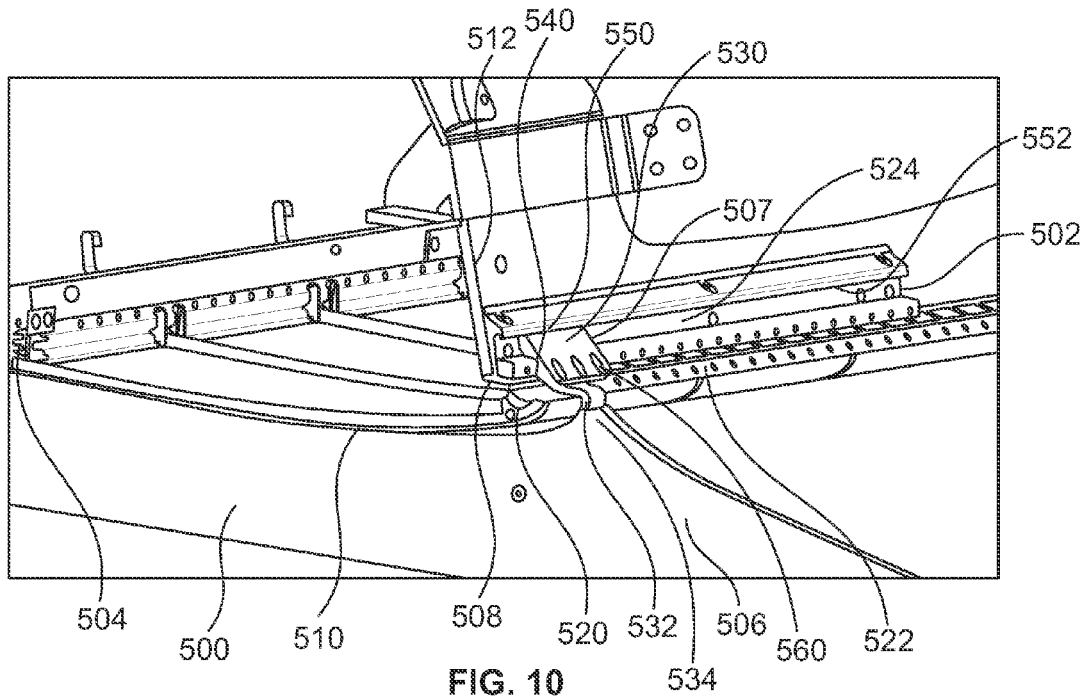
FIG. 10 illustrates a perspective view of a section divider assembly secured to an inboard rail and an outboard rail, according to an embodiment of the present disclosure.

FIG. 10 illustrates a perspective view of a section divider assembly 500 secured to an inboard rail 502 and an outboard rail 504, according to an embodiment of the present disclosure. The section divider assembly 500 is similar to any of those described above, and includes a header 506 connected to a bracket 507. The inboard rail 502 may be a separate rail secured over a PSU rail 508 that secures a PSU 510 to a fixed panel 512, such as a strongback. Alternatively, the inboard rail 502 may be integrally molded and formed with the PSU rail 510.

The inboard rail 502 may include a lower lip 520 having a plurality of longitudinally aligned fastener through holes 522 formed at increments. An internal recessed channel 524 is formed through the inboard rail 502.

The bracket 507 includes a rail-engaging main body 530 connected to a connecting beam 532 that is secured to an intermediate peak 534 of the header 506. The main body 530 includes a lip channel 540 that receives the lower lip 520. An upper end 550 of the main body 530 may be received within a reciprocal passage 552 formed in an upper portion of the inboard rail 507. The main body 530 may also include one or more fastener passages 560.

In order to move the section divider assembly 500 to a desired position, the main body 530 of the bracket 507 is slid through a portion of the length of the inboard rail 502. In response, a fitting connected to an outboard portion of the header 506 may slide through a portion of the outboard rail 504. After the section divider assembly 500 is located at a desired position in which the fastener passages 560 align with one or more fastener through holes 522 of the inboard rail 502, fasteners, such as screws or bolts, are tightened through the aligned fastener passages 560 and the fastener through holes 522 to secure the section divider assembly 500 in position.

Figure 11:
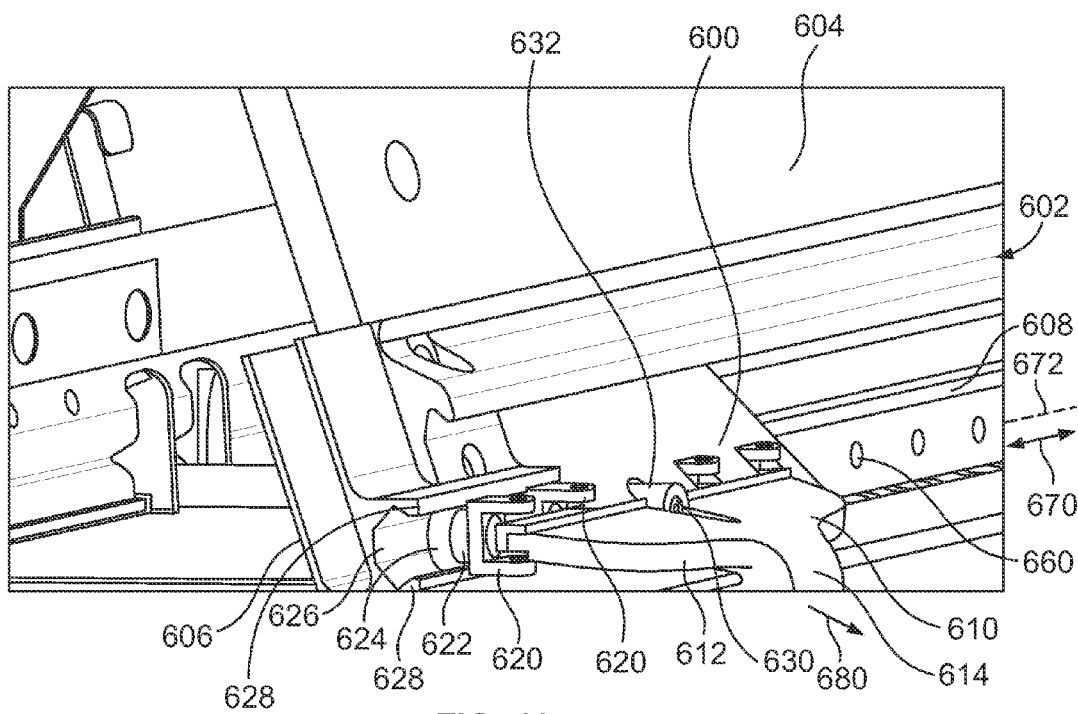
FIG. 11 illustrates a perspective view of a bracket moveably secured to an inboard rail that is secured to a fixed panel, according to an embodiment of the present disclosure.

FIG. 11 illustrates a perspective view of a bracket 600 moveably secured to an inboard rail 602 that is secured to a fixed panel 604, according to an embodiment of the present disclosure. The bracket 600 may be connected to a section divider assembly, such as any of those described in the present application. As shown, the fixed panel 604 may be a strongback within an internal cabin. The inboard rail 602 may include a PSU rail 606 connected to a divider adjustment rail 608. The PSU rail 606 and the divider adjustment rail 608 may be integrally molded and formed as a single piece, such as a unitary formed piece of aluminum.

The bracket 600 may include main body 610 similar to as described above. The main body 610 may include a support panel 612, from which a connecting beam 614 extends. An end of the connecting beam 614 may secure to an intermediate peak of a header of a section divider assembly (not shown in FIG. 11).

One or more bearings 620 may secure to the support panel 612. Each bearing 620 may rotatably retain a roller including a hub 622 having a wheel 624 that is rotatably secured within a channel 626 of the divider adjustment rail 608. The wheel 624 may be retained within the channel 626 through opposed ledges 628. A position securing member 630 (such as a pin, post, stud, fastener, or the like) is retained within a central sleeve 632 of the bracket 600. In the secured position, the position securing member 630 extends out of the sleeve 632 into a retaining hole 660 (such as a through hole) of the divider adjustment rail 608. The engagement between the position securing member 630 and the retaining hole 660 prevents the bracket 600 (and therefore the section divider assembly) from translating or otherwise moving in relation to the inboard rail 602 in the directions of arrows 670, which are parallel to a longitudinal axis 672 of the channel 626.

In order to readjust the bracket 600 (and therefore the section divider assembly), the position securing member 630 is pulled away from the channel 626 toward an inboard direction in the direction of arrow 680 so that the pin securing member 630 disengages from the retaining hole 660. For example, a wire, pull cord, or string may be secured to an end of the position securing member 630 so that it may be pulled in a disengaging direction. After the position securing member 630 is removed from the retaining hole 660, the bracket 600 (and therefore the section divider assembly) may be moved with respect to the inboard rail 602, such as by the wheels 624 rotating within the channel 626, to a desired position.

Figures 12, 13:
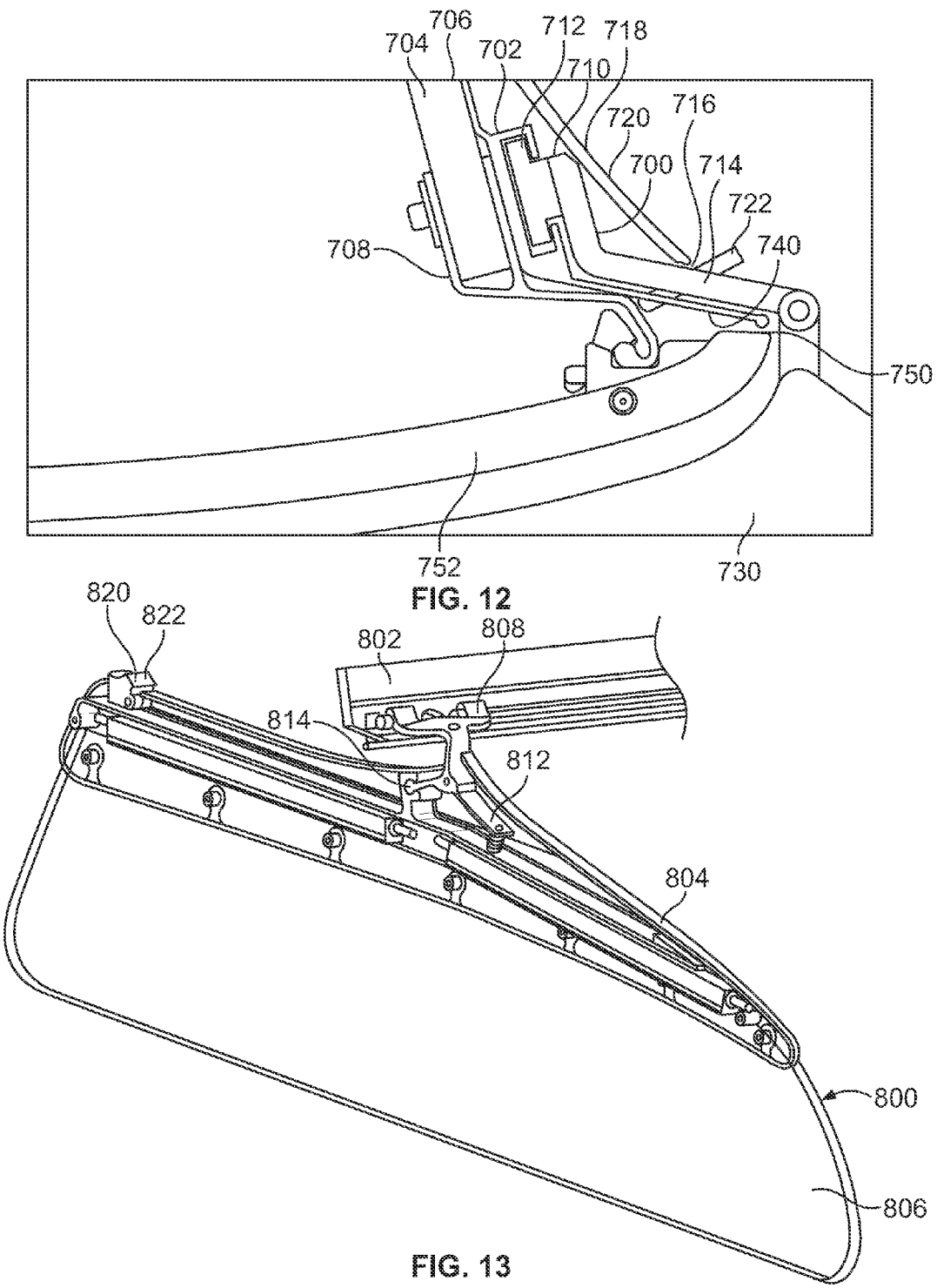
FIG. 12 illustrates an end view of a bracket moveably secured to an inboard rail that is secured to a fixed panel, according to an embodiment of the present disclosure.
FIG. 13 illustrates a perspective front view of a section divider assembly secured to an inboard rail, according to an embodiment of the present disclosure.

FIG. 12 illustrates an end view of a bracket 700 moveably secured to an inboard rail 702 that is secured to a fixed panel 704, according to an embodiment of the present disclosure. As shown, the inboard rail 702 may be a divider adjustment rail 706 that is fastened to a separate and distinct PSU rail 708. Optionally, the divider adjustment rail 706 and the PSU rail 708 may be integrally formed and molded as a single piece.

The embodiment shown in FIG. 12 is similar to the embodiment shown in FIG. 11. Wheels 710 are rotatably retained within a channel 712 of the inboard rail 702. As shown, the bracket 710 includes a connecting beam 714 that passes through a clearance space 716 between a covering flap 718 of a closeout panel 720 and the PSU rail 708. A closeout panel as shown in FIG. 12 may be used with any of the embodiments of the present disclosure. A retaining pin 722 may be used to secure the bracket 700, and therefore the section divider assembly 730, in position. For example, the retaining pin 722 may be a position securing member that passes through a portion of the bracket 700 (for example, holes formed therethrough) and a covering panel 740 (for example, holes formed therethrough) extending from the inboard rail 702 between a terminal edge 750 of a PSU 752 and the covering flap 718.

FIG. 13 illustrates a perspective front view of a section divider assembly 800 secured to an inboard rail 802, according to an embodiment of the present disclosure. The section divider assembly 800 is similar to any of those described in the present application, and includes a header 804 connected to a barrier 806. As shown, a bracket 808 may connect to internal portions within the header 804. For example, the bracket 808 may include connecting arms 812 and 814 that secure to reciprocal structures within the header 804, such as through fasteners, snap fits, interference fits, latches, and/or the like. Any of the section divider assemblies described in the present application may be secured to brackets in a manner as shown and described with respect to FIG. 13.

Further, as shown in FIG. 13, an outboard fitting 820 may include a deflectable attachment head 822 that is configured to be received and retained within a channel of an outboard rail. Once positioned within the channel of the outboard rail, the attachment head 822 may be slid therethrough in response to movement of the bracket 808 with respect to the inboard rail 802.

Figure 14:
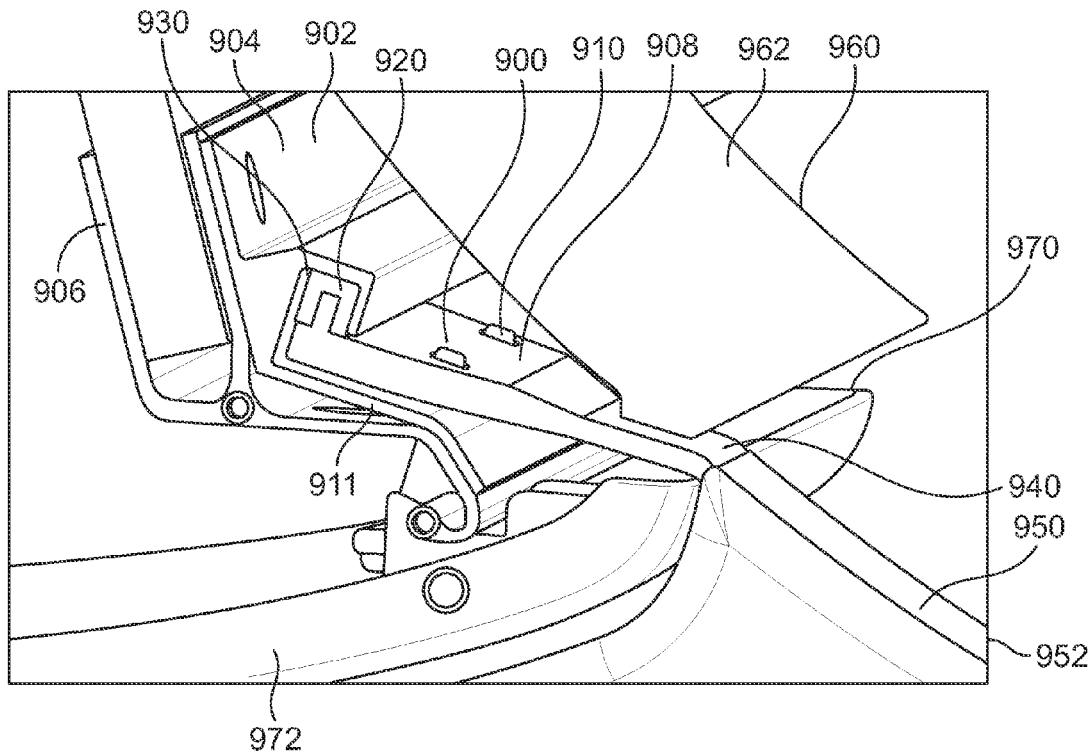
FIG. 14 illustrates a perspective front view of a bracket moveably secured to an inboard rail, according to an embodiment of the present disclosure.

FIG. 14 illustrates a perspective front view of a bracket 900 moveably secured to an inboard rail 902, according to an embodiment of the present disclosure. The inboard rail 902 may be or otherwise include a divider adjustment rail 904 connected to a PSU rail 906. The inboard rail 902 and the PSU rail 906 may be separate and distinct components, or may optionally be integrally formed and molded as an integral piece.

The bracket 900 shown in FIG. 14 may be used with any of the embodiments of the present disclosure. The bracket 900 may include a main body 908 that overlays a flat portion 911 of the inboard rail 902. One or more wheels 910 may be rotatably secured within the main body 908 and may engage the flat portion 911. Further, channel engagement members 920, such as wheels, sliding blocks, or the like, may be rotatably or slidably retained within a channel 930 of the inboard rail 902. As shown, a connecting beam 940 that secures to a header 950 of a section divider assembly 952 may extend through a clearance space between a covering flap 960 of a closeout panel 962 and a terminal edge 970 of a PSU 972.

Figure 15:
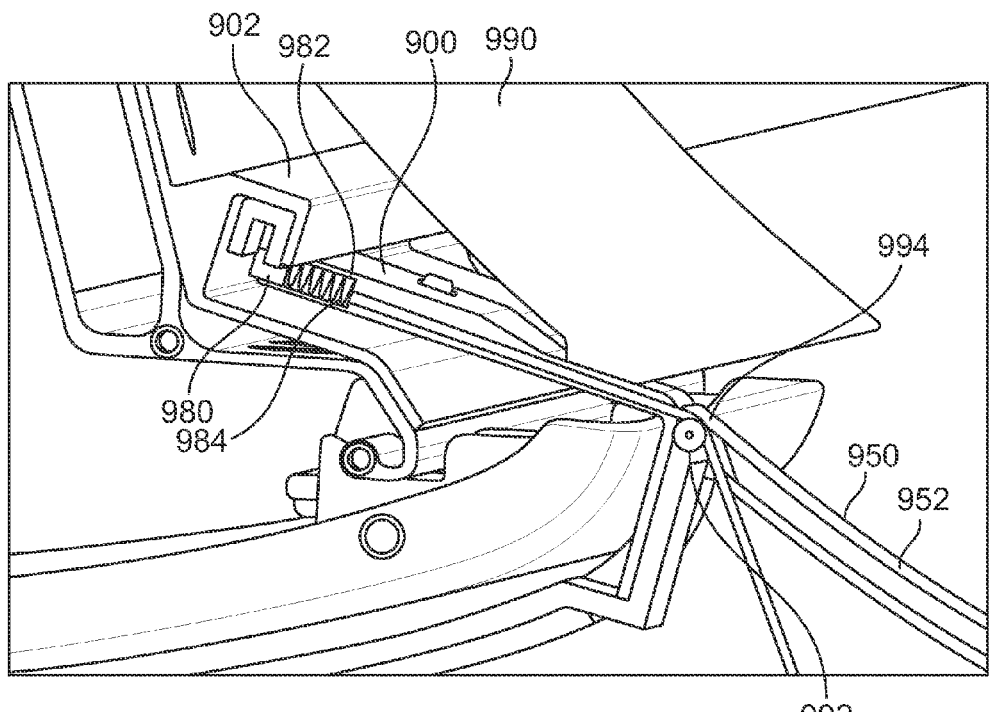
FIG. 15 illustrates a perspective, partial cross-sectional view of a bracket secured to an inboard rail, according to an embodiment of the present disclosure.

FIG. 15 illustrates a perspective, partial cross-sectional view of the bracket 900 secured to the inboard rail 902, according to an embodiment of the present disclosure. A position securing member 980 may be secured within a channel 982 of the bracket 900. The position securing member 980 may be spring-biased within the bracket 900 to an outwardly extending position through a coiled spring 984. An internal end of the position securing member 980 may be secured to a cord 990 that may extend through the bracket 900, and through a portion of the header 950. For example, the cord 990 may pass over a pulley 992 within the intermediate peak 994 of the header 950, and extend out of the header 950. An opposite end of the cord 990 may include a grippable handle that may be grasped and pulled.

In operation, an individual, such as a flight attendant, may pull on the handle of the cord 990, thereby overcoming the biasing force of the coiled spring 984, and removing the position securing member 980 from a retaining hole formed in the inboard rail 902. The attendant may then slide the section divider assembly 952 in relation to the inboard rail 902 (through slidable engagement of the bracket 900) to a desired location. When the section divider assembly 952 is positioned at a desired location, the cord 990 is released, and the spring 984 biases the position securing member 980 back to an outwardly extended position in which it is received and retained by a retaining hole within the inboard rail 902.

Referring to FIGS. 1-15, embodiments of the present disclosure provide section divider assemblies that are configured to provide a more open look and feel within an interior cabin of an aircraft. Additionally, embodiments of the present disclosure provide section divider assemblies that are aesthetically pleasing. Also, embodiments of the present disclosure provide systems and methods for quickly and efficiently positioning a section divider assembly within an interior cabin of an aircraft.

As described above, the inboard and outboard rails and the section divider assemblies may form section divider systems configured for use within an internal cabin of a vehicle, such an aircraft. For example, the section divider system may include a section divider assembly, such as any of those described in the present application, which may be secured to one or both of an inboard or outboard rail, which may be secured to fixed structures within the internal cabin. A closeout panel may be secured to a fixed structure and positioned within a gap between a stowage bin and a PSU. A clearance space may be provided between a terminal edge of the closeout panel and a portion of the PSU in order to allow a bracket secured to the section divider assembly to pass therethrough and connect to an inboard rail, for example.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A section divider system configured to separate sections within an internal cabin of a vehicle, the section divider system comprising:
   a first rail secured to a fixed panel within the internal cabin;
   a closeout panel secured to the fixed panel, wherein the closeout panel extends between the fixed panel and a passenger service unit (PSU) within the internal cabin, wherein a clearance space is formed between a portion of the closeout panel and the PSU, wherein the closeout panel is configured to prevent access to an interior of the PSU, wherein the closeout panel extends into a gap between a first lateral portion of the fixed panel and a second lateral portion of a stowage bin within the internal cabin, and wherein the closeout panel is further configured to prevent movement of fingers of an individual past a defined position within the gap;
   a bracket secured to the first rail, wherein one or more connecting beams extend from the bracket through the clearance space; and
   a section divider assembly connected to the one or more connecting beams.

2. The section divider system of claim 1, wherein the section divider assembly is configured to be moveably adjusted by the bracket being longitudinally moved in relation to the first rail.

3. The section divider system of claim 1, further comprising a second rail secured to one or both of the fixed panel or another fixed portion of the internal cabin, wherein the section divider assembly comprises a fitting that is secured to the second rail.

4. The section divider system of claim 3, wherein the fitting is moveably secured to the second rail.

5. The section divider system of claim 1, wherein the section divider assembly includes a header coupled to a barrier including a rigid panel extending downwardly from the header, wherein the section divider assembly is configured to be positioned over one or more seats within a row of the internal cabin.

6. The section divider system of claim 5, wherein the header is sized and shaped to be outside of a range of motion a pivotal bucket of the stowage bin.

7. The section divider system of claim 5, wherein the header comprises an intermediate peak that connects to the one or more connecting beams of the bracket.

8. The section divider system of claim 1, wherein the first rail comprises a plurality of regularly-spaced retaining holes, wherein each of the regularly-spaced retaining holes is configured to receive and retain a position securing member coupled to the bracket in order to secure the section divider assembly in position.

9. The section divider system of claim 1, wherein the closeout panel is cantilevered with respect to the fixed panel, and wherein the closeout panel comprises:
   a panel securing portion including a flat beam that overlies a portion of the fixed panel;
   a stop protuberance that extends downwardly and away from the flat beam, wherein the stop protuberance is configured to prevent an individual from reaching further into a gap between the fixed panel and the stowage bin, wherein the stop protuberance is configured to be spaced apart from the stowage bin; and
   a covering flap that extends downwardly from the stop protuberance, wherein the covering flap is configured to prevent access to the interior of the PSU, wherein the clearance space is formed between a terminal edge of the covering flap and the PSU.

10. The section divider system of claim 9, wherein the covering flap extends away from the flat beam at an angle.

11. The section divider system of claim 1, wherein the bracket is configured to be slidably moved through or on at least a portion of the first rail.

12. The section divider system of claim 1, wherein the bracket comprises one or more rollers configured to rotatably move on or through at least a portion of the first rail.

13. The section divider system of claim 1, wherein the bracket further comprises a spring-biased position securing member operatively connected to a pull cord.

14. The section divider system of claim 1, wherein the first rail is an inboard rail.

15. The section divider system of claim 1, wherein the first rail is integrally formed with a PSU rail that securely connects the PSU to the fixed panel.

16. A shielding assembly configured to be secured to a strongback within an internal cabin of a vehicle, wherein the shielding assembly is configured to extend into a gap between the strongback and a stowage bin having a bucket, the shielding assembly comprising:
   a panel securing portion including a flat beam that overlies a lateral portion of the strongback;
   a stop protuberance that extends downwardly and away from the flat beam, wherein the stop protuberance is configured to prevent an individual from reaching further into the gap between a fixed panel and the stowage bin, wherein the stop protuberance is configured to be spaced apart from the stowage bin; and
   a covering flap that extends downwardly from the stop protuberance, wherein the covering flap extends away from the flat beam at an angle, wherein the covering flap is configured to prevent access to an interior of a passenger service unit (PSU), and wherein a clearance space is formed between a terminal edge of the covering flap and the PSU, wherein the covering flap is substantially parallel to an inboard outer surface of the bucket.

17. A section divider system configured to separate sections within an internal cabin of a vehicle, the section divider system comprising:
   an inboard rail secured to a fixed strongback within the internal cabin;
   an outboard rail secured to one or both of the fixed strongback or another fixed portion of the internal cabin;
   a closeout panel secured to the strongback, wherein the closeout panel extends between the strongback and a passenger service unit (PSU) within the internal cabin, wherein the closeout panel extends into a gap between the strongback and a portion of a stowage bin within the internal cabin, wherein the closeout panel is further configured to prevent movement of fingers of an individual past a defined position within the gap, wherein a clearance space is formed between a portion of the closeout panel and the PSU, wherein the closeout panel is configured to prevent access to an interior of the PSU;
   a bracket secured to the inboard rail, wherein one or more connecting beams extend from the bracket through the clearance space; and
   a section divider assembly connected to the one or more connecting beams, wherein the section divider assembly is connected to the outboard rail through at least one fitting, wherein the section divider assembly is configured to be moveably adjusted in relation to the inboard rail and the outboard rail, wherein the section divider assembly includes a header coupled to a barrier extending downwardly from the header, wherein the section divider assembly is configured to be positioned over one or more seats within a row of the internal cabin, wherein the header comprises an intermediate peak that connects to the one or more connecting beams of the bracket.

18. The section divider system of claim 17, wherein one or both of the inboard rail and the outboard rail comprises a plurality of regularly-spaced retaining holes, wherein each of the regularly-spaced retaining holes is configured to receive and retain a position securing member coupled to the header in order to secure the section divider assembly in position.

19. The section divider system of claim 17, wherein the closeout panel is cantilevered with respect to the strongback, and wherein the closeout panel comprises:
   a panel securing portion including a flat beam that overlies a portion of the strongback;
   a stop protuberance that extends downwardly and away from the flat beam, wherein the stop protuberance is configured to prevent an individual from reaching further into the gap between the strongback and the stowage bin, wherein the stop protuberance is configured to be spaced apart from the stowage bin; and
   a covering flap that extends downwardly from the stop protuberance, wherein the covering flap is configured to prevent access to the interior of the PSU, wherein the clearance space is formed between a terminal edge of the covering flap and the PSU, wherein the covering flap extends away from the flat beam at an angle.

20. A section divider system configured to separate sections within an internal cabin of a vehicle, the section divider system comprising:

a first rail secured to a fixed panel within the internal cabin;

a closeout panel secured to the fixed panel, wherein the closeout panel extends between the fixed panel and a passenger service unit (PSU) within the internal cabin, wherein a clearance space is formed between a portion of the closeout panel and the PSU, wherein the closeout panel is configured to prevent access to an interior of the PSU, wherein the closeout panel is cantilevered with respect to the fixed panel, and wherein the closeout panel comprises: (a) a panel securing portion including a flat beam that overlies a portion of the fixed panel, (b) a stop protuberance that extends downwardly and away from the flat beam, wherein the stop protuberance is configured to prevent an individual from reaching further into a gap between the fixed panel and a stowage bin, wherein the stop protuberance is configured to be spaced apart from the stowage bin, and (c) a covering flap that extends downwardly from the stop protuberance, wherein the covering flap is configured to prevent access to the interior of the PSU, wherein the clearance space is formed between a terminal edge of the covering flap and the PSU;

a bracket secured to the first rail, wherein one or more connecting beams extend from the bracket through the clearance space; and a section divider assembly connected to the one or more connecting beams.

21. The section divider system of claim 20, wherein the covering flap extends away from the flat beam at an angle.

* * * * *